(12) United States Patent
Hudgin et al.

(10) Patent No.: US 11,496,546 B2
(45) Date of Patent: Nov. 8, 2022

(54) FILE DOWNLOAD MANAGER

(71) Applicant: Snap Inc., Santa Monica, CA (US)

(72) Inventors: Darryl Hudgin, Marina Del Rey, CA (US); Sebastian Gil, Venice, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 17/367,755

(22) Filed: Jul. 6, 2021

(65) Prior Publication Data

US 2021/0337012 A1 Oct. 28, 2021

Related U.S. Application Data

(63) Continuation of application No. 16/733,778, filed on Jan. 3, 2020, now Pat. No. 11,070,611, which is a continuation of application No. 15/912,129, filed on Mar. 5, 2018, now Pat. No. 10,574,731, which is a continuation of application No. 14/867,397, filed on Sep. 28, 2015, now Pat. No. 9,935,999.

(51) Int. Cl.
*G06F 15/16* (2006.01)
*H04L 67/06* (2022.01)
*H04L 67/01* (2022.01)
*H04L 67/63* (2022.01)

(52) U.S. Cl.
CPC .............. *H04L 67/06* (2013.01); *H04L 67/01* (2022.05); *H04L 67/63* (2022.05)

(58) Field of Classification Search
CPC .......... H04L 67/01; H04L 67/06; H04L 67/63
USPC ........................................................ 709/219
See application file for complete search history.

(56) References Cited

U.S. PATENT DOCUMENTS

| 5,859,973 | A | 1/1999 | Carpenter et al. |
| 6,038,295 | A | 3/2000 | Mattes |
| 6,980,909 | B2 | 12/2005 | Root et al. |

(Continued)

FOREIGN PATENT DOCUMENTS

CA 2887596 A1 7/2015

OTHER PUBLICATIONS

"U.S. Appl. No. 14/867,397, Examiner Interview Summary dated Sep. 8, 2017", 3 pgs.

(Continued)

*Primary Examiner* — Moustafa M Meky
(74) *Attorney, Agent, or Firm* — Schwegman Lundberg & Woessner, P.A.

(57) ABSTRACT

A download module accesses a download queue including at least two file download requests from an application running on a client device of a server. The application and each of the file download requests is associated with a context that comprises a set of context components that each indicates a part of the application. The file download request context components indicate parts of the application that use the requested file and the application context components indicate parts of the application that are active. The download module ranks each of the file download requests based on a comparison of the respective file download request context components of each file download request to the application context components of the application. The download module then selects two or more file download requests in the download queue for concurrent execution based on the respective rankings of the file download requests in the download queue.

20 Claims, 9 Drawing Sheets

(56) References Cited

U.S. PATENT DOCUMENTS

| | | |
|---|---|---|
| 7,173,651 B1 | 2/2007 | Knowles |
| 7,411,493 B2 | 8/2008 | Smith |
| 7,467,293 B2 | 12/2008 | Zhang et al. |
| 7,535,890 B2 | 5/2009 | Rojas |
| 8,099,482 B2 | 1/2012 | Clark et al. |
| 8,131,597 B2 | 3/2012 | Hudetz |
| 8,170,971 B1 | 5/2012 | Wilson et al. |
| 8,199,747 B2 | 6/2012 | Rojas et al. |
| 8,332,475 B2 | 12/2012 | Rosen et al. |
| 8,515,893 B2 | 8/2013 | Wilson et al. |
| 8,548,963 B2 | 10/2013 | Dettori et al. |
| 8,549,526 B2 | 10/2013 | Yamamoto et al. |
| 8,572,265 B2 * | 10/2013 | Queru ............... H04L 47/15 709/228 |
| 8,621,034 B1 | 12/2013 | Kembel et al. |
| 8,639,772 B2 | 1/2014 | Gentile et al. |
| 8,713,025 B2 | 4/2014 | Eder |
| 8,718,333 B2 | 5/2014 | Wolf et al. |
| 8,724,622 B2 | 5/2014 | Rojas |
| 8,756,187 B2 | 6/2014 | Wilson et al. |
| 8,856,364 B2 * | 10/2014 | Queru ............... H04L 47/15 709/228 |
| 8,856,657 B2 * | 10/2014 | Arbogast ............ H04L 41/22 715/740 |
| 8,874,677 B2 | 10/2014 | Rosen et al. |
| 8,909,583 B2 | 12/2014 | Wilson et al. |
| 8,909,679 B2 | 12/2014 | Root et al. |
| 8,995,433 B2 | 3/2015 | Rojas |
| 9,015,610 B2 | 4/2015 | Hunter |
| 9,037,578 B2 | 5/2015 | Brust et al. |
| 9,040,574 B2 | 5/2015 | Wang et al. |
| 9,055,416 B2 | 6/2015 | Rosen et al. |
| 9,100,806 B2 | 8/2015 | Rosen et al. |
| 9,100,807 B2 | 8/2015 | Rosen et al. |
| 9,160,801 B1 | 10/2015 | Wise |
| 9,184,925 B1 | 11/2015 | Wise |
| 9,191,776 B2 | 11/2015 | Root et al. |
| 9,204,252 B2 | 12/2015 | Root |
| 9,208,443 B2 | 12/2015 | Wilson et al. |
| 9,244,916 B2 * | 1/2016 | Berger ............ H04L 67/5681 |
| 9,286,910 B1 | 3/2016 | Li et al. |
| 9,298,827 B2 | 3/2016 | Spencer et al. |
| 9,430,617 B2 | 8/2016 | Brust et al. |
| 9,443,227 B2 | 9/2016 | Evans et al. |
| 9,489,661 B2 | 11/2016 | Evans et al. |
| 9,491,134 B2 | 11/2016 | Rosen et al. |
| 9,578,103 B1 | 2/2017 | Wise |
| 9,639,709 B2 | 5/2017 | Clark et al. |
| 9,774,564 B2 * | 9/2017 | Quan ............... G06F 16/183 |
| 9,871,846 B2 * | 1/2018 | Hagan ............... H04L 67/10 |
| 9,917,915 B2 | 3/2018 | Kanaya |
| 9,935,999 B1 | 4/2018 | Hudgin |
| 10,367,915 B2 | 7/2019 | Levanon et al. |
| 10,574,731 B1 | 2/2020 | Hudgin et al. |
| 2005/0238144 A1 | 10/2005 | Flathers et al. |
| 2005/0276234 A1 * | 12/2005 | Feng ............... H04L 65/4046 370/260 |
| 2006/0074750 A1 | 4/2006 | Clark et al. |
| 2006/0117172 A1 | 6/2006 | Zhang et al. |
| 2006/0168123 A1 | 7/2006 | Krstulich |
| 2008/0235696 A1 | 9/2008 | Yamamoto et al. |
| 2009/0164607 A1 | 6/2009 | Clark et al. |
| 2009/0276715 A1 * | 11/2009 | Arbogast ............ H04L 67/06 715/736 |
| 2011/0112863 A1 | 5/2011 | Gogineni et al. |
| 2011/0202598 A1 | 8/2011 | Evans et al. |
| 2012/0209924 A1 | 8/2012 | Evans et al. |
| 2012/0233287 A1 * | 9/2012 | Queru ............... H04L 47/15 709/217 |
| 2012/0233342 A1 * | 9/2012 | Queru ............... H04L 67/06 709/228 |
| 2013/0073691 A1 * | 3/2013 | Quan ............... H04L 67/06 709/219 |
| 2014/0040501 A1 * | 2/2014 | Queru ............... H04L 47/15 709/234 |
| 2014/0195699 A1 | 7/2014 | Sokol, Jr. et al. |
| 2014/0215071 A1 | 7/2014 | Lee et al. |
| 2014/0344266 A1 | 11/2014 | Bennett et al. |
| 2015/0058397 A1 | 2/2015 | Kanaya |
| 2015/0095460 A1 * | 4/2015 | Berger ............... H04L 67/59 709/219 |
| 2015/0365464 A1 * | 12/2015 | Hagan ............... H04L 67/06 709/203 |
| 2016/0112486 A1 | 4/2016 | Levanon et al. |
| 2016/0234293 A1 * | 8/2016 | Berger ............ H04L 67/1097 |
| 2016/0301738 A1 | 10/2016 | Gentile et al. |
| 2016/0344794 A1 | 11/2016 | Gentile et al. |
| 2018/0084083 A1 | 3/2018 | Levanon et al. |
| 2018/0132173 A1 | 5/2018 | Miramonti et al. |
| 2020/0259902 A1 | 8/2020 | Chen |
| 2020/0296151 A1 * | 9/2020 | Berger ............... H04L 65/61 |

OTHER PUBLICATIONS

"U.S. Appl. No. 14/867,397, Non Final Office Action dated Jul. 28, 2017", 12 pgs.

"U.S. Appl. No. 14/867,397, Notice of Allowance dated Nov. 30, 2017", 7 pgs.

"U.S. Appl. No. 14/867,397, Response filed Sep. 1, 2017 to Non Final Office Action dated Jul. 28, 2017", 15 pgs.

"U.S. Appl. No. 15/912,129, Non Final Office Action dated Jun. 13, 2019", 5 pgs.

"U.S. Appl. No. 15/912,129, Notice of Allowance dated Oct. 4, 2019", 7 pgs.

"U.S. Appl. No. 15/912,129, Response filed Sep. 3, 2019 to Non-Final Office Action dated Jun. 13, 2019", 3 pgs.

"U.S. Appl. No. 16/733,778, Final Office Action dated Feb. 12, 2021", 6 pgs.

"U.S. Appl. No. 16/733,778, Non Final Office Action dated Nov. 6, 2020", 5 pgs.

"U.S. Appl. No. 16/733,778, Notice of Allowance dated Mar. 17, 2021", 7 pgs.

"U.S. Appl. No. 16/733,778, Response filed Feb. 4, 2021 to Non Final Office Action dated Nov. 6, 2020", 8 pgs.

"U.S. Appl. No. 16/733,778, Response filed Mar. 9, 2021 to Final Office Action dated Feb. 12, 2021", 7 pgs.

Leyden, John, "This SMS will self-destruct in 40 seconds", [Online] Retrieved from the Internet: <URL: http://www.theregister.co.uk/2005/12/12/stealthtext/>, (Dec. 12, 2005), 1 pg.

U.S. Appl. No. 14/867,397 U.S. Pat. No. 9,935,999, filed Sep. 28, 2015, File Download Manager.

U.S. Appl. No. 15/912,129 U.S. Pat. No. 10,574,731, filed Mar. 5, 2018, File Download Manager.

U.S. Appl. No. 16/733,778 U.S. Pat. No. 11,070,611, filed Jan. 3, 2020, File Download Manager.

* cited by examiner

FILE DOWNLOAD MANAGER

PRIORITY APPLICATION

This application is a continuation of, and claims priority to U.S. patent application Ser. No. 16/733,778, filed Jan. 3, 2020, which is a continuation of, and claims priority to U.S. patent application Ser. No. 15/912,129, filed Mar. 5, 2018, which is a continuation of, and claims priority to U.S. patent application Ser. No. 14/867,397, filed Sep. 28, 2015, the disclosure of each are incorporated herein in their entirety by reference.

TECHNICAL FIELD

The subject matter disclosed herein generally relates to the coordination of file download requests for an application running on a client device so as to increase download throughput. In particular, a download manager may be provided to prioritize file download requests for the application so that concurrently downloading a small number of the most high priority requests will result in the requested files being made available to the client device more rapidly.

BACKGROUND

The use of electronic communications, such as e-mail or text messages, to transmit audio, images, video, multimedia, etc., over networks such as the Internet, has grown dramatically in recent years. Furthermore, the purchase of media (e.g., music or videos) for delivery or distribution over the Internet has also become very popular. Due to increases in available bandwidth, lower cost memory and efficient file formats, the download of media files via the Internet is now practical. However downloading large media files, such as for high definition videos, can often be time consuming. An application running on a client device of a user will connect, e.g., via the Internet, with a server computer that stores available media files such as electronic messages for download or commercial media files for purchase or rent. In this way, the user of the client device can browse, preview, purchase and/or download available media files from the server, e.g., download a message (including video) from a friend of the user. These operations involving media files can be bandwidth-intensive and the user can experience delays if earlier file download requests have still not been completed. For example, the download of a media file to a client device may still be ongoing when the user of the client device decides to perform another operation (e.g., browse) that requires the download of file(s). In this situation, any file download request generated by the subsequent browse operation will probably have to wait for the complete execution of the earlier file download operation.

BRIEF DESCRIPTION OF THE DRAWINGS

The present disclosure is illustrated by way of example, and not by way of limitation, in the figures of the accompanying drawings, in which.

DETAILED DESCRIPTION

The present disclosure relates to management and prioritization of data file (e.g., media files) downloading. More particularly, the disclosed embodiments relate to media file downloading in a client-server environment. A media file can, for example, be a file including image, audio or video data.

Embodiments of various aspects of the disclosure are discussed below with reference to FIGS. 1-8. However, those skilled in the art will readily appreciate that the detailed description given herein with respect to these figures is for explanatory purposes only.

Embodiments described herein relate to systems and methods for downloading data files over a network. The data files to be downloaded may include, for example, media files that are included in messages sent between users of the network or media files that are purchased. In order to download a message file (including media) from a server where it is stored, a user of a client device of the server can search and browse through numerous messages stored for the user (e.g., via a messaging application) that are available for download from the server. Once the user selects message(s) for viewing, a download request for the media files included in the selected message(s) are added to a download queue of file download requests by the messaging application. Although the file download requests are added to the download queue based on the order of the user selections, the order in which the file download requests are executed need not be the same. For example, file download requests from the download queue may be selected for execution based on a comparison of respective contexts of the file download requests (e.g., which parts of the application will use the requested files) in the download queue to a current context of the messaging application (e.g., which parts of the application are currently active).

The content of the downloaded files may be encrypted or otherwise configured for limited use on the client device. For example, a message sender may only wish the recipient to be in possession of the media in a message for a specific period of time. Ephemeral messages set to be automatically deleted from the client device and/or the server (including any associated media files) after a specific trigger event or a specified period of time may be used to implement such features.

Overview

Figure 1:
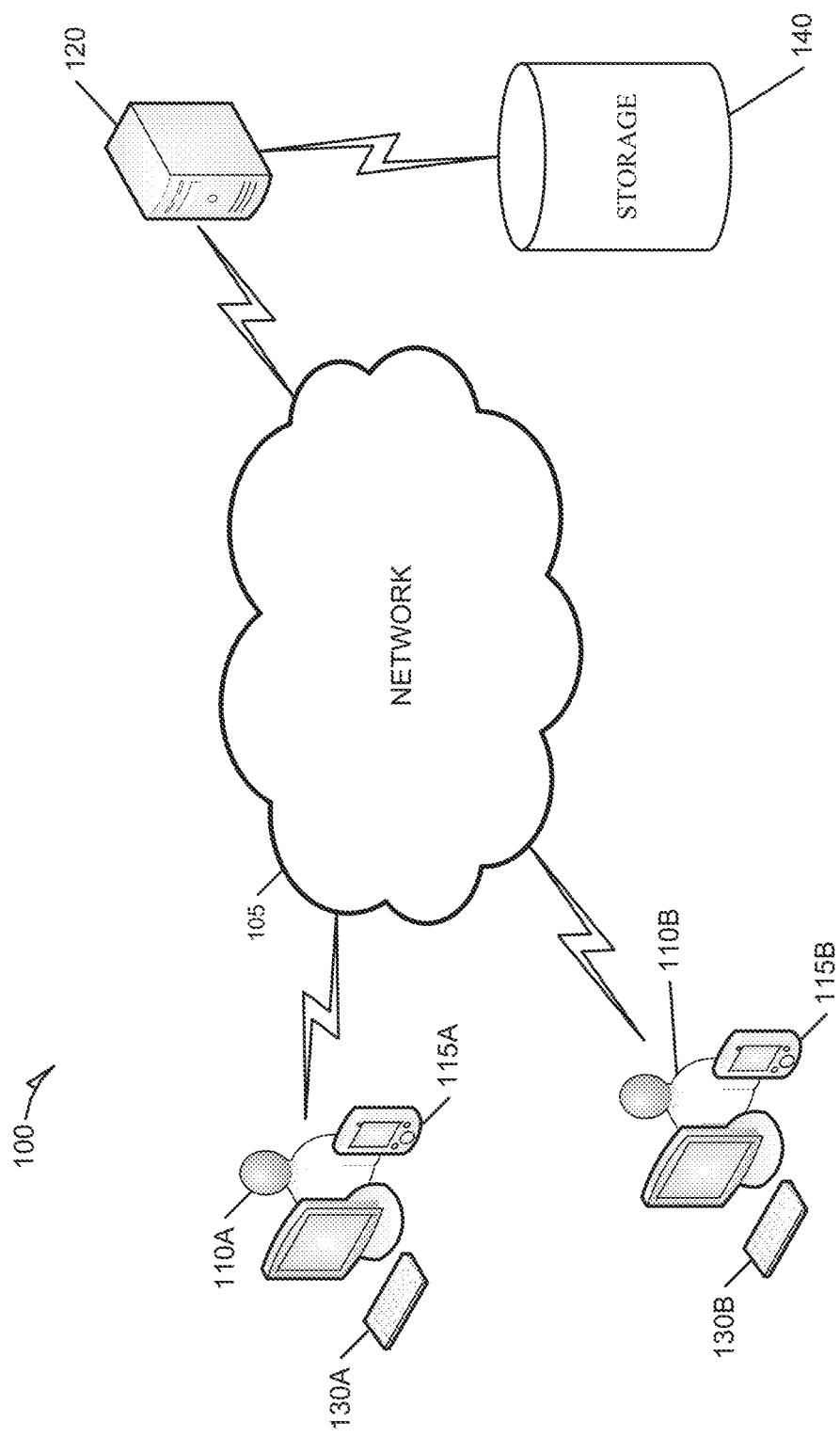
FIG. 1 is a use-case diagram showing a system configured to process file download requests over a network consistent with some embodiments.

FIG. 1 is a use-case diagram showing a system 100 configured to process file download requests over a network 105 (e.g., the Internet) consistent with some embodiments. In an embodiment, a server 120 may store data files or act as a storage controller for storage 140 that stores data files available for download to a client device. Therefore, server 120 represents a remote storage server that couples to the data network 105. The server 120 coordinates review and/or download of data files by users 110A and 110B of client devices of the server 120. The client devices may be mobile client devices 115A and 115B (e.g., a smart phone) or more static client devices 130A and 130B (e.g., a desktop computer) of a user 110 of the network 105. The download of data files from server 120 (or storage 140) may result, for example, from varied operations of a user 110A of client device 115A such as browsing files for download in the context of messaging or file purchase transactions (e.g., media purchase via e-commerce website). For these operations, the client device 115A may include a media player (e.g., software application for manipulating media files) that communicates with server 120 through network 105. Using such a media player application (e.g., a browser application or a messaging application), user 110A of client device 115A may interact with the server 120 to review and download/purchase media files. Once download of a file is requested by user 110A of client device 115A, the file can be accessed from the storage 140 over the network 105 by way of the server 120 which may coordinate the download of the requested file with all other currently pending requests for files from server 120 and/or storage 140.

In an embodiment of the system 100, the files available for download are stored in the storage 140 and retrieved via a download module of server 120. Hence, the server 120 need not burden its resources to store any of the files that may be downloaded to a client device, e.g., 115A. Instead, when a file has been requested by client device 115A, the file (e.g., a pointer to the file) may be added to a list of files be downloaded (e.g., a queue). In addition to purchased media files, other files such as messages to user 110A (e.g., from user 110B) that have been received at storage 140 via server 120 may be automatically added to the list of files be downloaded. The download module may then coordinate the download of the requested files. In accordance with one embodiment, the download manager concurrently downloads two or more of the requested files. In this regard, the download manager may identify the files corresponding to a particular download request from the storage 140 and transmit the files (e.g., at least some concurrently) through the data network 105 to the client device 115A. The downloaded files can then be stored on the client device 115A. In one embodiment, the downloaded files are stored on the client device 115A in a standard manner (e.g., persistent storage), in another embodiment, the downloaded media content is stored on the client device 115A as an ephemeral message (e.g., temporary storage).

In accordance with one embodiment, concurrent downloading of files may be accomplished by opening a separate HTTP connection for each requested file being downloaded. The download module may manage a pre-determined maximum number of concurrent download operations (e.g., 3). Furthermore, the connections through the network 105 between the server 120, the client device 115A and 115B and the storage 140 can be accomplished through secure connections, such as Secure Sockets Layer (SSL). Furthermore, the downloaded files may be stored at the storage 140 and/or client device 115A and 115B in an encrypted manner.

Concepts

File Download Request: A request issued by application code to download a data file, e.g., a media file.

Rank: Relative level of importance assigned to a file download request that has been placed in a download queue.

Context: A set of components that indicate parts of an application. Each file download request has a context based on which part of a requesting application will use the requested file, and the requesting application has a current context based on which part of the application is currently active. The active part of the requesting application may be determined based on, for example, a user 110's location in the application or content the user 110 is interacting with in the application.

Context Component (CC): One element of a context which could, for example, be represented as a string. Example context component strings could be based on application location: "Publisher", "Chat"; or content a user 110 is interacting with: "Magazine" (publisher media), "Vacation Gallery" (viewing public media gallery).

Context match score (CMS): The number of CCs that are present in both contexts when comparing two contexts.

Contextual priority level (CPL): Download priority level relative to the context as measured by the CMS.

Relative ordering value (ROV): A value optionally assigned to requests to help rank requests which match in context match score and contextual priority level. If not assigned, this will default to the current time to ensure FIFO (first in first out) ordering of download requests.

Executor: A specified subset of a shared resource (e.g., bandwidth) used to execute a download request. Each executor can run one request at a time.

System Architecture

Figure 2:
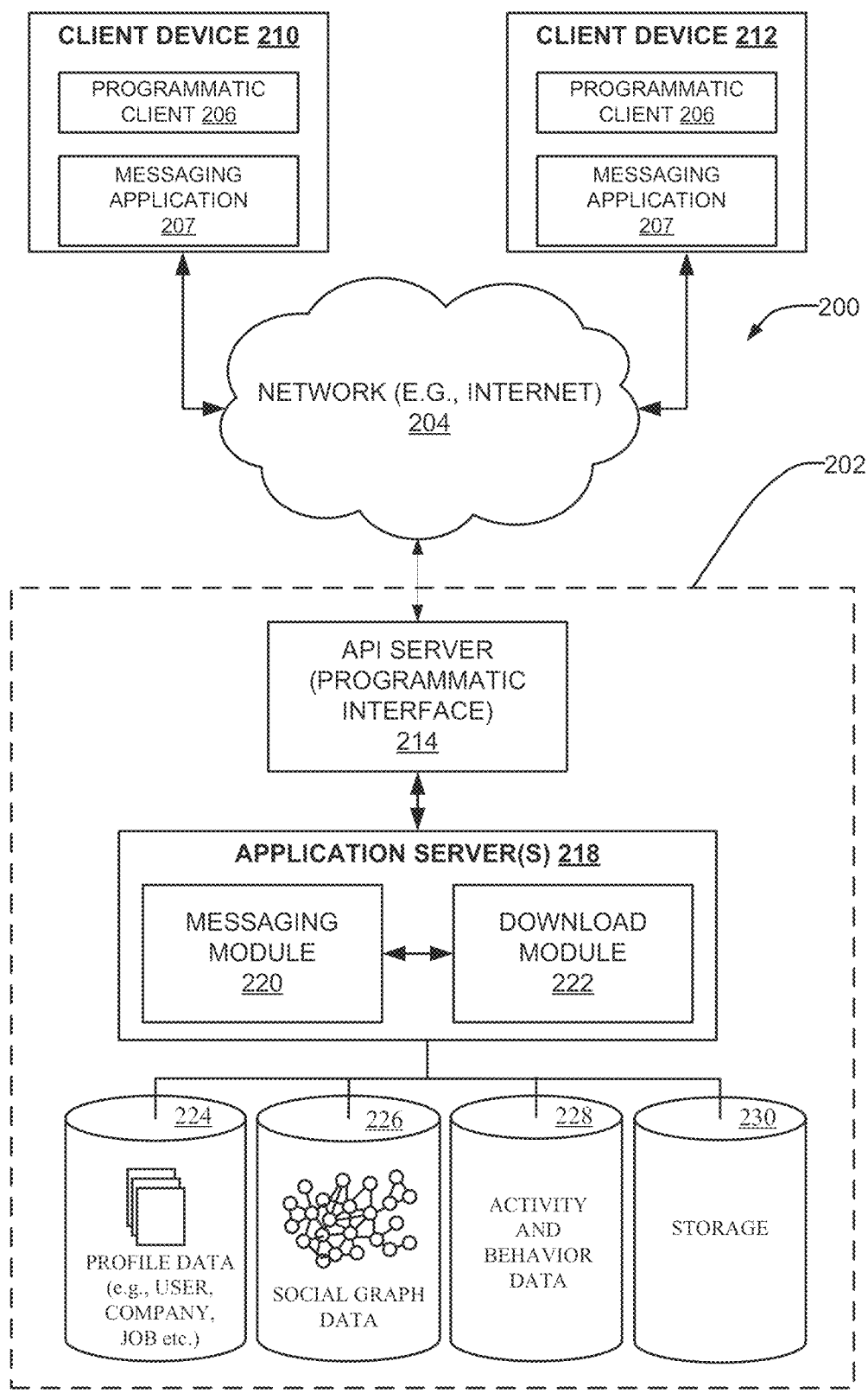
FIG. 2 is a block diagram illustrating an example of a network environment including a server operating a system for processing file download requests for users of client devices, consistent with some embodiments.

FIG. 2 is a block diagram depicting a system 200 having a client-server architecture configured for exchanging data (e.g., files) over a network 105, according to some embodiments. For example, the system 200 may be a messaging system where clients may communicate and exchange data within the system 200. The data may pertain to various functions (e.g., sending and receiving text, photo and video communications) and aspects (e.g., publication of blogs and websites) associated with the system 200 and its users 110A, 110B. Although illustrated herein as client-server architecture, other embodiments may include other network architectures, such as peer-to-peer or distributed network environments.

A data exchange platform 202, in an example, includes a messaging module 220 and a download module 222, and may provide server-side functionality via a network 204 (e.g., the Internet) to one or more clients. Although described as residing on a server (e.g., application server(s) 218) in some embodiments, in other embodiments, some or all of the functions of messaging module 220 and download module 222 may be provided by a client device (e.g., via a messaging application 207 of client device 210). The one or more clients may include users 110 that use the network system 200 to exchange data over the network 204. These operations may include transmitting, receiving, communicating, and processing data to, from, and regarding content and users 110 of the network system 200. The data may include, but is not limited to, content and user data such as user profiles, messaging content, messaging attributes, media files, client device information, and geolocation information, among others.

In various embodiments, the data exchanges within the system 200 may be dependent upon user-selected functions available through one or more client or user interfaces (UIs). The UIs may be associated with a client machine, such as client devices 210, 212 using a programmatic client 206, such as a client application. The programmatic client 206 may be in communication with the messaging module 220 (and download module 222) via an application server 218.

The client devices 210, 212 may comprise mobile devices with wireless communication components and applications for sending specific types of electronic messages (e.g., ephemeral media files) over network 204 (e.g., via messaging application 207). For example, the system 200 allows a user 110 of the client device 210 to utilize the messaging application 207 to browse, search or sort through a plurality of messages sent to the user of client device 210 (e.g., user 110A). Media files associated with the messages (e.g., image or short video from a friend) have been stored in a storage 230 and may be downloaded to client device 210 via the download module 222 of the application server(s) 218. In an embodiment, the messaging application 207 may allow the user 110A to preview a clip of a media file (e.g., still thumbnails or other portions of the media) before it is downloaded to the client device 210. In an embodiment, an application server 218 may serve as an on-line commerce transaction server through which the user 110A pays for access rights to a particular media file which is then downloaded from the storage 230.

Turning specifically to the messaging module 220 and the download module 222, an application program interface (API) server 214 is coupled to, and provides programmatic interface to, one or more application server(s) 218 that host the messaging module 220 and download module 222. The application server(s) 218 is, in turn, shown to be coupled to storage in the form of one or more database(s) 224, 226, 228 and 230. In other embodiments the application server(s) 218 could, of course, be coupled to other data storage mediums.

The API server 214 communicates and receives data pertaining to messages, among other things, via various user input tools. For example, the API server 214 may send and receive data to and from an application (e.g., via the programmatic client 206) running on another client machine (e.g., client devices 210, 212 or a third party server).

In one example embodiment, the messaging module 220 provides messaging functionality for users 110 of the client devices 210, 212 to send and receive ephemeral messages that automatically disappear after a triggering event has been detected, such as, for example, the messages having been viewed by the recipient for a specified period of time. The client devices 210, 212 can access and view the messages via the application server(s) 218, which may access the message content, such as media files, from, for example, the storage 230.

In an embodiment, one or more application server(s) 218 includes or acts as a download module 222 for storage 230 that may include messages (including associated media files) received from a client device 210 or 212. A user 110A of client device 210 may use messaging application 207 (in conjunction with messaging module 220) to browse a list of messages received from friends of the user 110A or other content available from other users 110 of data exchange platform 202 (e.g., blog or podcast). Once user 110A has selected a message (or other content) for viewing, any media files associated with the selected message (e.g., short video clip) are placed in a download queue for download to client device 210 of user 110A. The download queue may be maintained by the download module 222, or may be maintained by the messaging module 220 and may simply be accessed by the download module 222. The download module 222 may then coordinate the download of multiple files (e.g., from storage 230 to client device 210) corresponding to the file download requests in the download queue.

In an embodiment, the download module 222 may divide the available resources (of system 200) for downloading files into a specified number of executors for the purpose of concurrently downloading multiple files. For example, a system with the available download resources split into three separate executors for concurrently downloading files can result in increased download throughput when multiple file download requests are present in the download queue. In this way, based on an executor becoming available (e.g., is no longer downloading a file and therefore bandwidth is available) the download module 222 will start executing the next acceptable file download request in the download queue. The process of determining which file download request in the download queue is selected by the download module 222 for download by the available executor is explained below.

In an embodiment, the download module 222 compares a respective context (e.g., a set of context components) of each of the file download requests in the download queue to a current context of the messaging application 207. As noted above, the context components (e.g., in a text string format) each indicate a part of the application. The context components of the context of a file download request indicate parts of the messaging application 207 that use the requested file and the context components of the context of messaging application 207 indicate parts of the application that are currently active. For example, the context of a file download request for a video clip file may be "viewer, browser" indicating that a viewer part (to view the full clip) and a browser part (to view a thumbnail of the clip or preview the clip) of messaging application 207 will use the downloaded video clip file. Meanwhile, the context of messaging application 207 may be "browser, message" indicating, for example, that the browser part of messaging application 207 is active and that user 110A is currently interacting with a message (e.g., content part of application) via the browser part of messaging application 207. In a particular embodiment, the context component of messaging application 207 that indicates an active content part of the application (e.g., content the user 110A is interacting with) may specify some other attribute of the content, for example, a source of the content such as a sender of a message or a publisher of a piece of media. For example, the context of messaging application 207 may be "browser, message, sender" indicating that the browser part of messaging application 207 is active and that user 110A is currently interacting with a message from sender.

In an embodiment, the download module 222 compares the respective context of each file download request in the download queue to the context of messaging application 207 to determine a similarity between the contexts so that file download requests with contexts that are similar to the current context of messaging application 207 are given priority when selecting a file download request from the download queue for execution. A context match score (CMS) representing the number of context components that are present in both contexts when comparing two contexts may be used for this purpose. For example the file download request for a video clip file with context: "viewer, browser" would have a CMS of 1 with respect to messaging application 207 with context "browser, message", since "browser" is the only matching context component between the two contexts.

The download module 222 then ranks each of the file download requests in the download queue based on the comparisons, e.g., based on the CMS of each of the file download requests in the download queue with respect to the current context of messaging application 207. As noted above, although the file download requests are added to the download queue based on the order of the file selections by user 110A, the order in which the file download requests are executed need not be the same. Therefore the download module 222 ranks the file download requests in the download queue based on the context comparisons so that the highest ranking file download request is executed if it is acceptable, as explained below.

Depending on how many of the executers are currently available, the download module 222 may select two or more of the file download requests in the download queue for execution based on the respective rankings of the file download requests in the download queue. In other words, the file download requests (in the download queue) with the higher CMS values are deemed more important (e.g., higher rank) and will be the first file download requests selected by the download module 222 (in order of rank) for execution once an executer is available.

However, when two (or more) file download requests in the download queue have the same CMS then the file download request(s) with the higher context priority level (CPL) are deemed more important (e.g., higher rank) and will be the first file download requests (from among the two (or more) file download requests in the download queue that have the same CMS) selected by the download module 222 (in order of rank) for execution once an executer is available. As noted above, each of the file download requests specifies an in-context priority level and an out-of-context priority level which may, for example, be based on the type of file requested for download, e.g., thumbnails have high in-context value since they are used to preview full images and may also be assigned a high out-of-context priority level based on being of small size and relatively easy to download. However, other types of files (e.g., publisher icons for a publisher UI) might only be of high priority when they are in-context, such as when a user is interacting the publisher UI and might be assigned a medium or low priority otherwise. The CPL can help the download module 222 to distinguish between files that are more (or less) important based on whether their context matches the current context of messaging application 207. In an embodiment, the CPL can include two priority levels: one for in-context and another for out of context. The contextual priority level is the in-context priority if the context match score of the request (with respect to the requesting application) is >0, otherwise it is the out of context priority. Furthermore, the CPL can be based on historical information regarding the behavior of the user 110A with this type of file, e.g., user 110A usually views received message media files quickly. For example, the historical information regarding the behavior of the user 110A (e.g., in any of: activity and behavior data (database 228), social graph data (database 226) and profile data (database 224)) may include information regarding the behavior of the recipient 110A in regard to: electronic messages from a particular sender (user 110B), electronic messages including a type of electronic media, electronic messages received at a specific time, electronic messages received at a specific location, electronic messages received with a specific device, or electronic messages of a particular size (e.g., greater than a specific size). In this way, the file download request may include an accurate CPL value with regard to files requested for download by user 110A. The download module 222 will rank file download requests with an equal CMS based on whether the CMS is greater than zero, e.g., are the equal CMS file download requests in context (at least one matching context component with the current context of messaging application 207) or out of context (no matching context component with the current context of messaging application 207). The download module 222 will rank the two (or more) file download requests based on their respective in-context priority levels based on the CMS being greater than zero; or rank the two (or more) file download requests based on their respective out-of-context priority levels based on the CMS being zero.

Table 1 below illustrates example CPL values (e.g., low to high) for different types of file download requests (e.g., a small media file such as a still picture) based on whether the components of the context of a file download request of the file download request type match any of the context components of the current context of messaging application 207 (e.g., in-context CPL value used) or not (e.g., out-of-context CPL value used). For example, files that are needed quickly in order for a part of the application to function smoothly (e.g., media files associated with messages that have not yet been viewed by a user) would have high CPL values both in-context and out-of-context. On the other hand when a user interacts with, for example, a part of the application used for searching and viewing media content from various publishers, files that are not initially needed for smooth operation of this application part (e.g., specific publisher video files) may be a medium priority download while these same files would be low priority downloads if the user was not interacting with the application part used for searching and viewing media content from various publishers.

TABLE 1

| | Requests | In context | Out of context |
|---|---|---|---|
| 1 | Still Image | HIGH | BACKGROUND_HIGHEST |
| 2 | Public Gallery Image | MEDIUM_HIGH | BACKGROUND_HIGH |
| 3 | Public Gallery Thumbnail | HIGH | BACKGROUND_HIGH |
| 4 | Publisher Icon | HIGH | BACKGROUND_MEDIUM |
| 5 | Publisher Video | MEDIUM | BACKGROUND_LOW |
| 6 | Publisher Image File | LOW | BACKGROUND_LOWEST |
| 7 | Chat or SMS Media File | HIGH | BACKGROUND_MEDIUM |
| 8 | Image Filter | HIGH | BACKGROUND_MEDIUM |

However, when two (or more) file download requests in the download queue have the same CMS and the same CPL (e.g., same in-context or out-of-context CPL) then the file download request(s) with the lower relative ordering value (ROV) are deemed more important (e.g., higher rank) and will be the first file download requests (from among the two (or more) file download requests in the download queue have the same CMS and the same CPL) selected by the download module 222 (in order of rank) for execution once an executer is available. As noted above, each of the file download requests specifies an ROV which, like the CPL, can be based on the type of file requested for download and/or based on historical information regarding the behavior of the user 110A with this type of file, e.g., user 110A usually views purchased video clips immediately. Alternatively, if an ROV is not assigned to a file download request then the time at which the file download request is added to the download queue may be used for this function so that the download queue maintains a FIFO ordering of the download requests. The download module 222 will rank file download requests with an equal CMS and CPL based on the ROV value.

The download module 222 may, after the file download requests in the download queue have been ranked based on a combination of CMS, CPL and ROV, select two or more (depending on how many executors are available) of the ranked file download requests in the download queue for concurrent execution. However, as noted above, the selected file download requests must also be acceptable for download, which means a selected file download request must satisfy specified context rules in regard to the other file download requests being currently executed by executers of system 200. For example, a context limit rule considers whether the respective contexts of at least two file download requests being concurrently executed (or that will be concurrently executed if they are selected) include a same context component. In this situation, the download module 222 can discard another file download request selected for download if the context of the selected request includes the same context component as the two file download requests being concurrently executed and re-rank each of the other file download requests in the download queue based on the CMS, CPL and ROV comparisons as described above. The download module 222 then selects a file download request in the download queue (to replace the discarded file download request) based on the respective re-ranking of each of the file download requests and based on the selected file download request not including the same context component as the two file download requests being concurrently executed. Such a context limit rule provides the ability to limit a single part or feature of the application from monopolizing available download resources (e.g., executors) by allowing the download module 222 to select a maximum of two file download requests including a same context component for execution so that other parts of the application are not completely blocked from downloading files at any moment.

For example, if the download module 222 is working with three executors to concurrently download media files, when an executor becomes available, the download module 222 will choose a pending file download request as follows:

Executor 1: executing request with context ["Publisher", "Magazine A"]
Executor 2: executing request with context ["Publisher", "Magazine B"]
Executor 3: available
Current application context: ["Publisher", "Magazine B"]
Ranked Download Queue: 1) request with context ["Publisher", "Magazine B"], 2) request with context ["Public Gallery", "User A"]

The download module 222 will select the request that is ranked second for execution on executor 3 despite the lower ranking (e.g., not ranked first) in order to let other parts of the application make progress on their downloads despite being out of context and therefore having a lower CMS. Other context related rules may be checked by the download module 222 before a selected file download request is removed from the download queue to be executed.

In an embodiment, the system 200 allocates a subset of download resources (e.g., bandwidth) in the form of executors for the download of relatively small files. The download module 222 (or messaging module 220) may maintain a separate small file download queue for file download requests from the messaging application 207 which request the download of files that meet a small size threshold. For example, the system 200 may include two small file executors for concurrently downloading small data files. The small size threshold for small files may be set, e.g., 5 MB, and files with a size that is less than or equal to the small size threshold may be placed in the small file download queue to await execution. Because the small files can be rapidly downloaded they are not ranked by the download module 222 and instead are executed in a FIFO manner based on respective time at which the small file download requests was issued by the messaging application 207.

In an embodiment, the application server(s) 218 transmit (e.g., via user messaging module 220) the message from the client device 210 to a client device 212 associated with a recipient (user 110B) of the message upon receipt of a request from the client device 212. The request could, for example, be automatic upon launching a messaging application 207 on the client device 212. The application server(s) 218 may insert instructions in the message to instruct the client device 212 to store the message in memory for only a specified time period and/or to display the message for only a specified time period (e.g., specified by the messaging application 207 of the client device 210) so that the messages are "ephemeral" messages. The application server(s) 218 may then delete the message from whichever of the logical disks of database 230 it is currently stored on based on the detection of a triggering event. In some embodiments, the message may also be stored on the client device 212 but then subsequently deleted based on the detection of a triggering event. In an embodiment, the triggering event for deleting a message comprises responding to the message at the client device 212 prior to the expiration of the specified time period, e.g., by sending a return message prior to the expiration of the time period without closing the messaging application 207.

User Interface

Figure 3A:
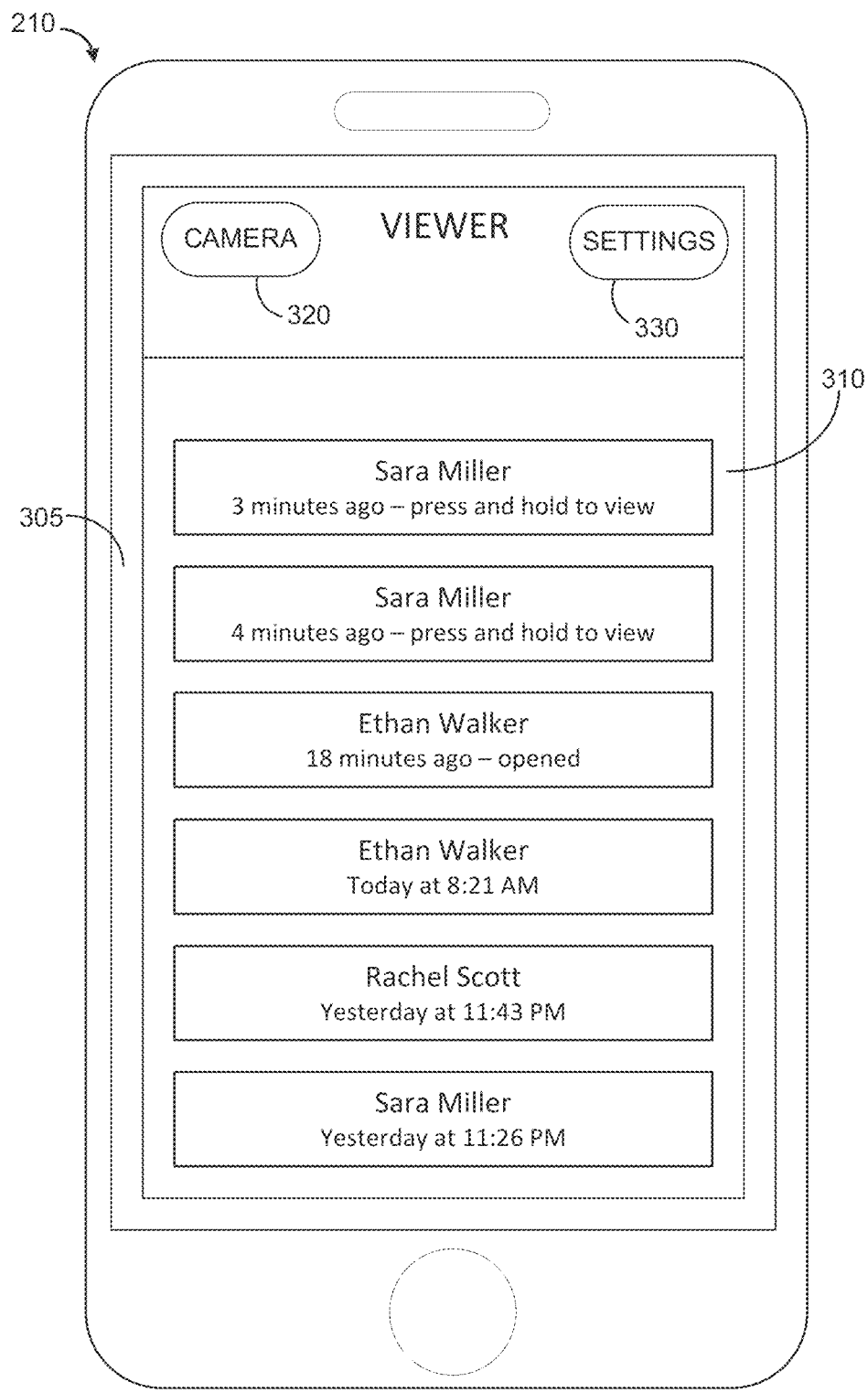
FIGS. 3A and 3B are display diagrams illustrating messaging and media viewing user interface options provided to a user a mobile computing device.
Figure 3B:
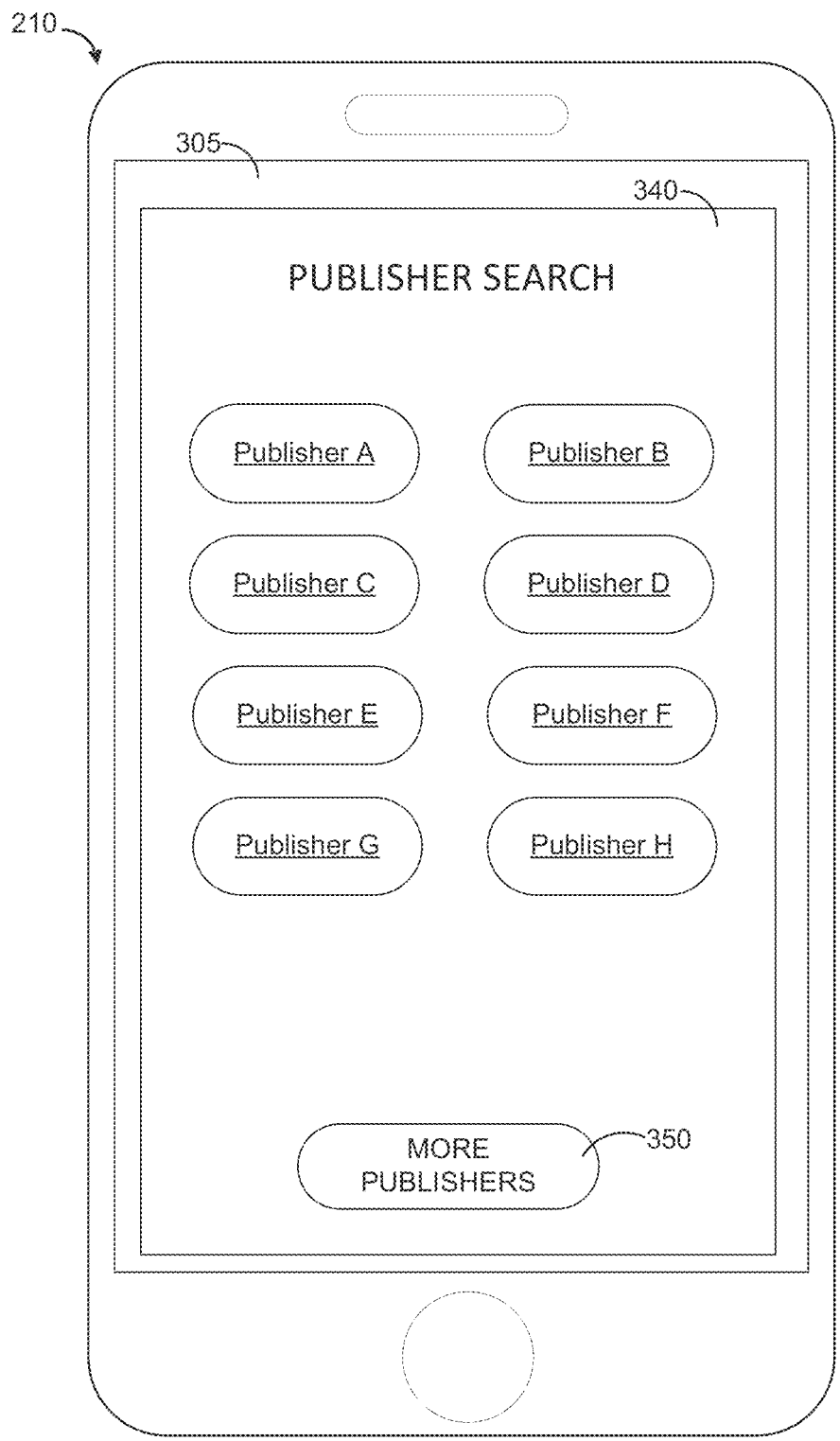

FIGS. 3A and 3B are display diagrams illustrating messaging and media viewing user interface options provided to a user (e.g., 110A) of a client device 210 in the form of a mobile computing device. As shown in FIG. 3A, client device 210, including a display 305 and at least one processor, may send and/or receive a communication (including media files) via the user messaging module 220 of the application server(s) 218 such as, for example, a communication including a short video clip from another client device 212 of the application server(s) 218. The client device 210 may present to a user 110A, via user interface objects that may be generated by the messaging application 207 (e.g., user interface objects 310, 320 and 330 on the display 305), options (e.g., press and hold to view) associated with messages received via application server(s) 218 from other users (e.g., Sara Miller) of data exchange platform 202. As explained above, download module 222 of application server(s) 218 ranks a set of file download requests in a download queue for file download requests from messaging application 207. Data files available for download (including media files associated with the message from client device 212) are stored in database storage 230. In this way, a few highly ranked file download requests can be selected to be concurrently executed in order to improve download throughput to client device 210.

In the example of FIG. 3A, a user 110A of a client device 210 may launch messaging application 207 for the purpose of checking for messages that the user 110A has received, for example, from user 110B of client device 212. The user 110A may be presented with a selection of messaging options via a "viewer" user interface object 310 (e.g., of messaging application 207) which provides options 320 and 330 for user selection. A camera mode may be available via a "camera" option 320 to be used for creating media files (e.g., images or video) that can be transmitted via messages to user 110B (e.g., in response to a received message) of client device 212. In the example, the "settings" option 330 may launch a list of options for sending and/or viewing messages via the messaging application 207, such as how long a message will be available for viewing once it is received and opened. The user messaging module 220 may insert instructions in the message from client device 212 to instruct client device 210 to store the message in a local memory for only a specified time period and/or to display the message for only a specified time period (e.g., specified by the messaging application 207 of the client device 212) so that the messages are "ephemeral" messages. The storage 230 may also delete any copies of the message based on the detection of a triggering event. The browsing of the messages for selection by user 110A may involve file download requests for small thumbnail files that are rapidly downloaded via the separate small file download request queue as explained above. Once the user 110A selects a message for viewing (e.g., presses and holds for viewing), any files (e.g., from storage 230) required for viewing the message are placed in the download queue to await execution as explained above.

In the example of FIG. 3B, a user 110A of a client device 210 may launch messaging application 207 for the purpose of checking for media content from publishers in the form of media files that can be downloaded to the client device 210, for example, a magazine article with an associated video from a publisher of magazines. The user 110A may be presented with a selection of publisher icons (e.g., Publisher A-Publisher H) for which associated media content is available (e.g., via storage 230) for selection via a "publisher search" user interface object 340. Further such publishers may be discoverable via a "more publishers" option 350. In the example, the selection of a publisher by user 110A may involve file download requests for publisher media files that are downloaded via an available executer as explained above.

Data Flow

Figure 4:
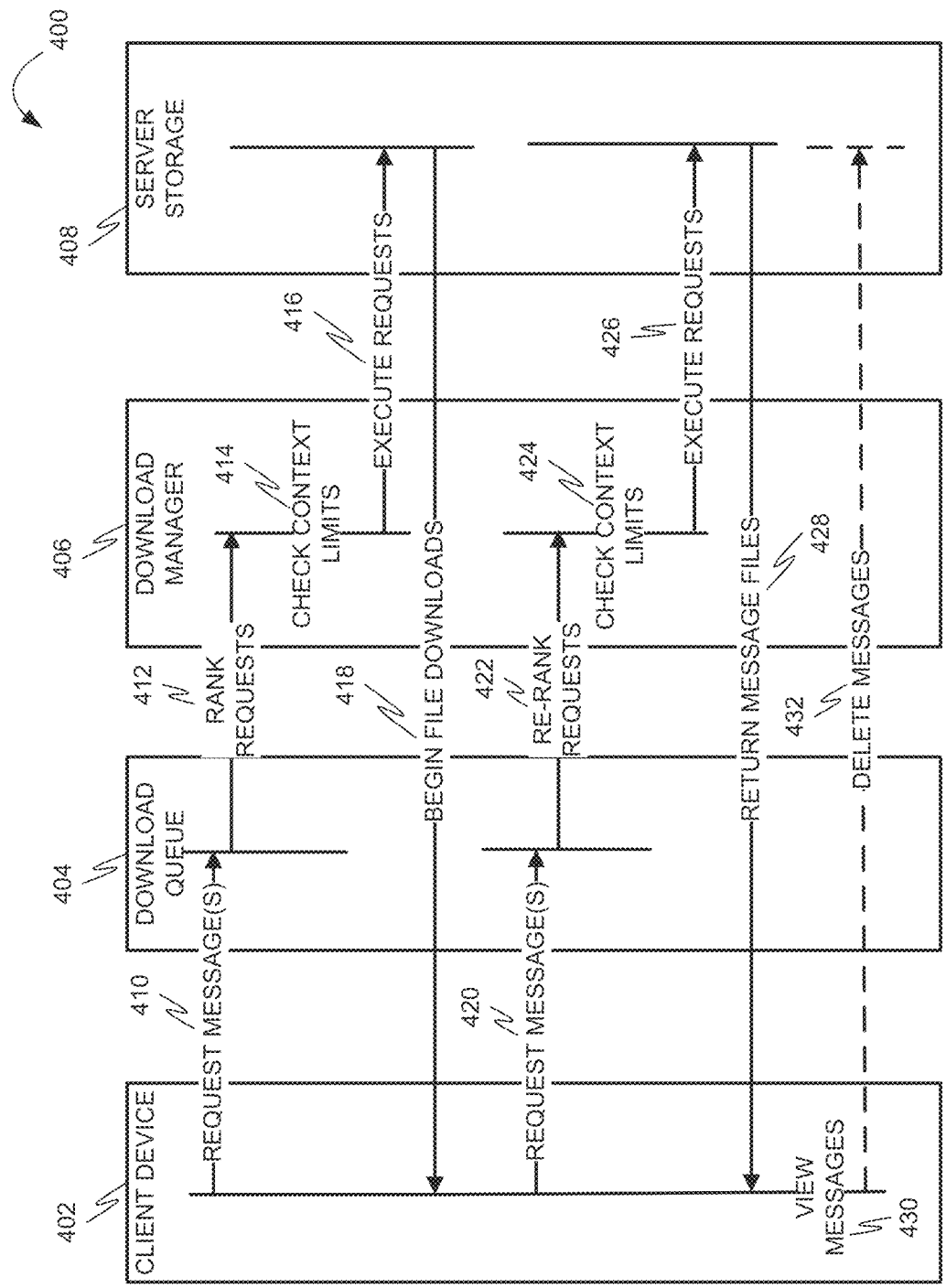
FIG. 4 is a ladder diagram illustrating a method, in accordance with an example embodiment, for processing file download requests.

FIG. 4 is a ladder diagram illustrating a method 400, in accordance with an example embodiment, for processing file download requests. A user (e.g., user 110A) uses a client device 402 (e.g., client device 210) to view messages received from other users (e.g., user 110B). At operation 410, the user 110A of the client device 402 selects received messages (e.g., using messaging application 207) for viewing and associated file download requests are added to the download queue 404. At operation 412, if there is an executor available, the download manager 406 (e.g., download module 222) ranks the file download requests in the download queue 404 based on comparing the context of each of the file download requests against the current context of the messaging application 207, e.g., comparing CMS, CPL and ROV as explained above. At operation 414, the highest ranked file download requests are selected by the download manager 406 and these file download requests are checked against the context limit rule (as explained above) if any currently executing file download requests share a common context component. At operation 416, the download manager 406 executes the selected file download requests to server storage 408 (e.g., storage 230) and the server storage 408, at operation 418, begins transmitting the requested files to the client device 402, e.g., via messaging module 220.

At operation 420, while the previously requested files are still being downloaded, the user 110A of the client device 402 selects further received messages (or other media files) for viewing and associated file download requests are added to the download queue 404. At operation 422, the download manager 406 re-ranks the file download requests in the download queue 404 based on comparing the context of each of the file download requests against the current context of the messaging application 207, as explained above. At operation 424 the highest ranked file download requests are selected by the download manager 406 and these file download requests are checked against the context limit rule if the previously requested files that are still being downloaded share a common context component. At operation 426, the download manager 406 executes the selected file download requests to server storage 408 (e.g., storage 230) and the server storage 408, at operation 428, transmits the requested files to the client device 402. At operation 430 the user 110A of client device 402 may view the messages (e.g., view downloaded media files) and, if the messages are ephemeral messages (as explained above), at operation 432 the messages may be deleted from the client device 402 and/or server storage 408 based on having been viewed at the client device 402.

Methods

Figure 5:
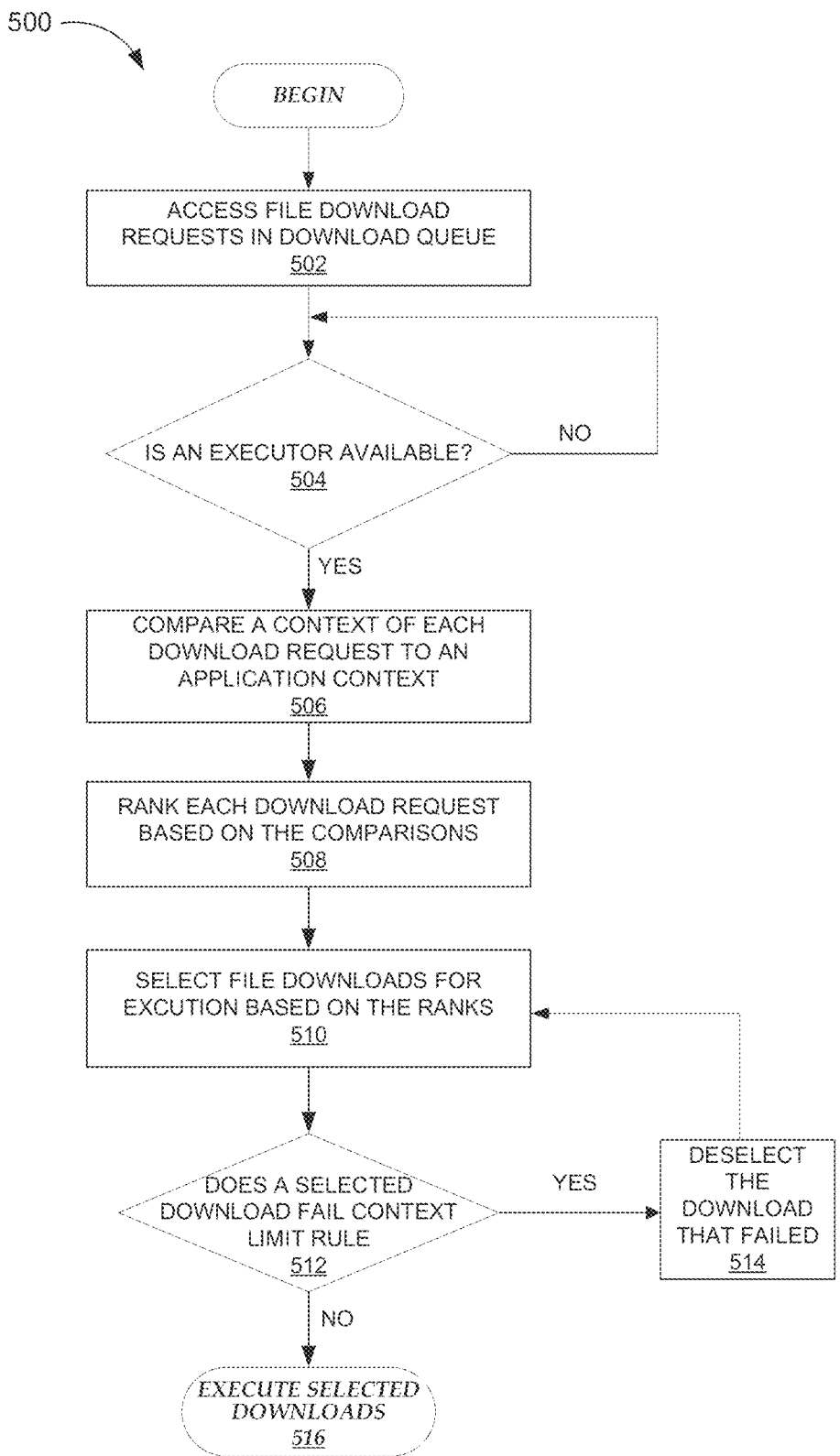
FIG. 5 is a flow diagram illustrating one example embodiment of an operation of the download module.

FIG. 5 is a flow diagram illustrating an example method 500 of an operation of the download module 222. At operation 502, a download queue 404 including file download requests is accessed (e.g., file download requests from messaging application 207) and at operation 504 it is determined if there is an executor available to execute a file download request from the download queue 404. If there are no currently available executors then, the method returns to operation 504 to await an executor available to execute a file download request from the download queue 404. If there is at least one available executor then, at operation 506, the respective contexts of each of the file download requests in the download queue 404 is compared against the current context of the requesting messaging application 207, as explained above. At operation 508, the file download requests in the download queue 404 are ranked based on comparing the contexts, e.g., comparing CMS, CPL and ROV as explained above. At operation 510, the highest ranked file download requests are selected for execution by the available executor(s) and, at operation 512, these file download requests are checked against the context limit rule (as explained above) if any currently executing file download requests (e.g., on currently unavailable executors) share a common context component. At operation 514, if a selected file download request does not pass the context limit rule, the selected file is deselected and the method returns to operation 510 to select a file download request from the download queue 404 to replace the file download request that was deselected. At operation 516, if no selected file download request fails to pass the context limit rule, the selected file download requests are concurrently executed to download the requested files from storage 230.

Figure 6A:
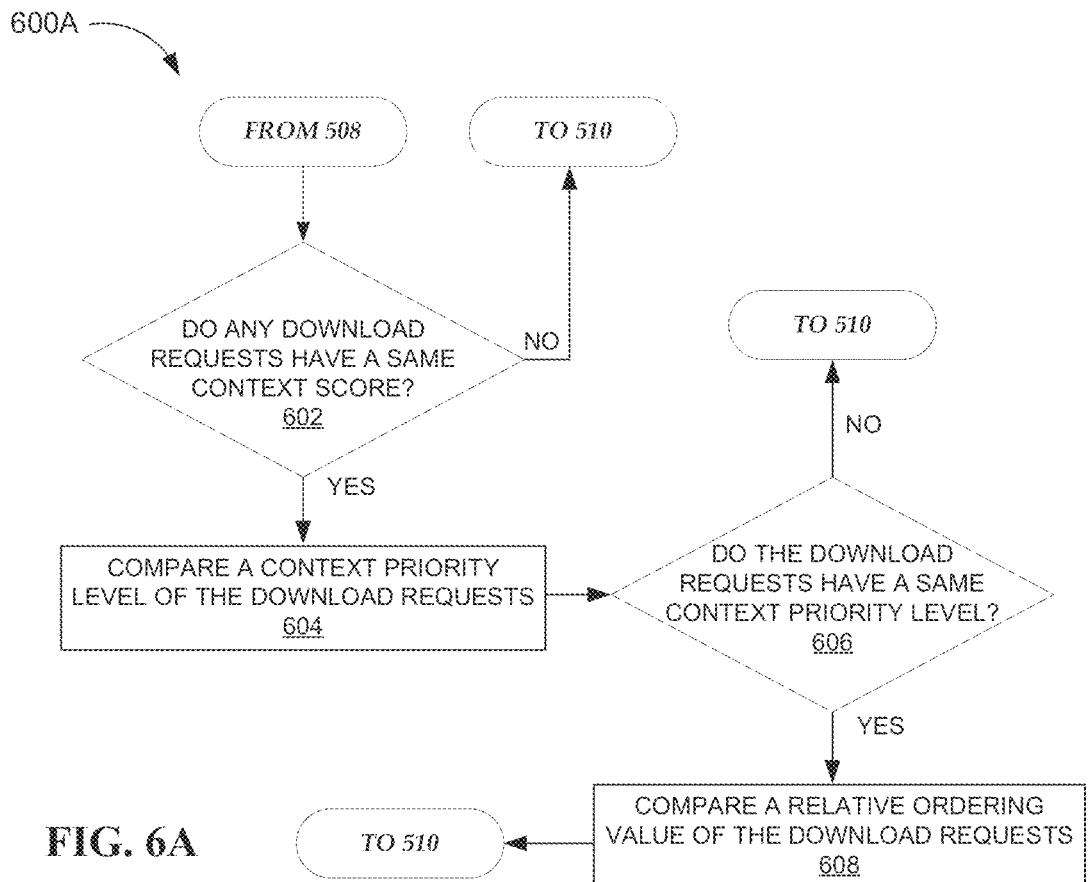
FIGS. 6A and 6B are flow diagrams illustrating example embodiments of operations of the download module.

FIG. 6A is a flow diagram illustrating one example embodiment of a method 600A of the download module 222. At operation 602, which continues from the ranking at operation 508 of FIG. 5, it is determined whether any of the file download requests in the download queue 404 have the same CMS. If it is determined that none of the file download requests has a same CMS then the method returns to operation 510 to select file download requests for execution based on the comparison. If it is determined that there are file download requests in the download queue 404 that have the same CMS then the method proceeds to operation 604 where the CPL of the file download requests that have the same CMS is compared. At operation 606, it is determined whether the file download requests being compared have the same CPL. If it is determined that the file download requests being compared do not have the same CPL then the method returns to operation 510 to select file download requests for execution based on the comparison. If it is determined that the file download requests being compared do have the same CPL then the method proceeds to operation 608 where the ROV of the file download requests that have the same CPL is compared. The method then returns to operation 510 to select file download requests from the download queue 404 for execution based on the comparison.

Figure 6B:
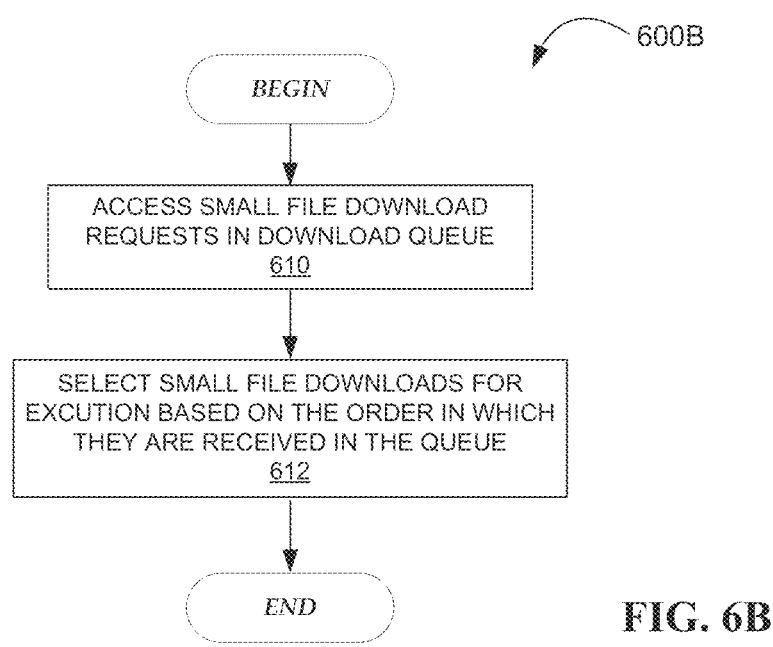

FIG. 6B is a flow diagram illustrating one example embodiment of a method 600B of the download module 222. At operation 610, a small file download queue for small file download requests from the messaging application 207 is accessed. As explained above, this queue is for file download requests for files that meet a specified small size threshold. At operation 612, the next 2 (or other specified quantity) of small file download requests from the small file download queue are selected for concurrent execution. As noted above, the small files can be rapidly downloaded and therefore are not ranked before they are selected. Instead, small file download requests are executed in a FIFO manner based on respective time at which the small file download requests were received in the queue.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client, or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respectively different hardware-implemented modules at different times. Software may, accordingly, configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiples of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via the network 105 or network 204 (e.g., the Internet) and via one or more appropriate interfaces (e.g., APIs).

Electronic Apparatus and System

Example embodiments may be implemented in digital electronic circuitry, or in computer hardware, firmware, or software, or in combinations of them. Example embodiments may be implemented using a computer program product (e.g., a computer program tangibly embodied in an information carrier, e.g., in a machine-readable medium for execution by, or to control the operation of, data processing apparatus, e.g., a programmable processor, a computer, or multiple computers).

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network 204.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., an FPGA or an ASIC).

The computing system can include clients and servers. A client and server are generally remote from each other and typically interact through a communication network 204. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed in various example embodiments.

Example Computer System

Figure 7:
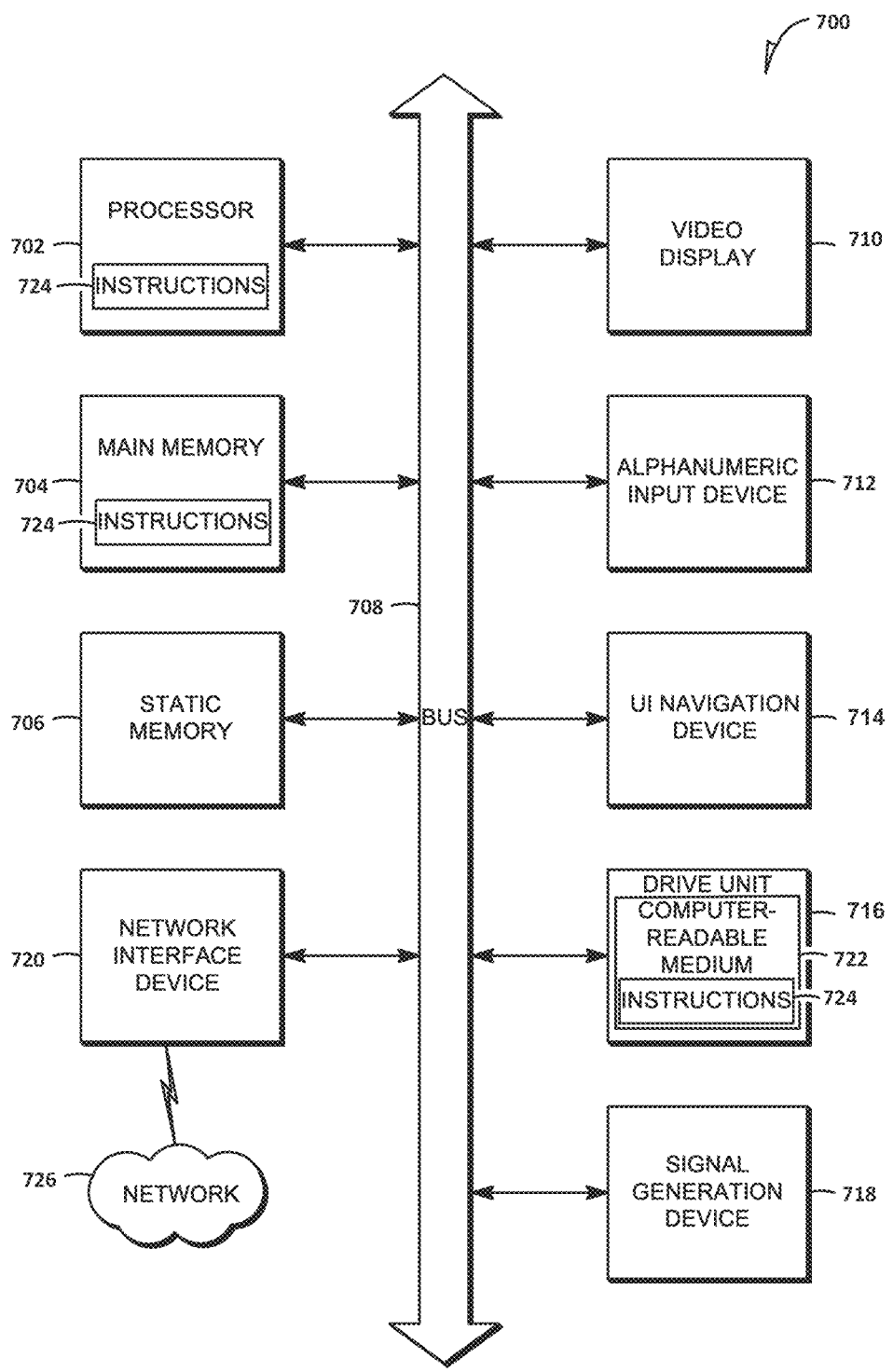
FIG. 7 is a diagrammatic representation of machine, in the example form of a computer system, within which a set of instructions may be executed to cause the machine to perform any of the methodologies discussed herein.

FIG. 7 shows a diagrammatic representation of a machine in the example form of a machine or computer system 700 within which a set of instructions 724 may be executed, causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch or bridge, or any machine capable of executing a set of instructions 724 (sequential or otherwise) that specify actions to be taken by that machine. Further, while only a single machine is illustrated, the term "machine" shall also be taken to include any collection of machines that individually or jointly execute a set (or multiple sets) of instructions 724 to perform any one or more of the methodologies discussed herein.

The example computer system 700 includes a processor 702 (e.g., a central processing unit (CPU), a graphics processing unit (GPU), or both), a main memory 704, and a static memory 706, which communicate with each other via a bus 708. The computer system 700 may further include a video display unit 710 (e.g., a liquid crystal display (LCD) or a cathode ray tube (CRT)). The computer system 700 also includes an alphanumeric input device 712 (e.g., a keyboard), a UI navigation device 714 (e.g., a mouse), a drive unit 716, a signal generation device 718 (e.g., a speaker), and a network interface device 720.

The drive unit 716 includes a computer-readable medium 722 on which is stored one or more sets of data structures and instructions 724 (e.g., software) embodying or used by any one or more of the methodologies or functions described herein. The instructions 724 may also reside, completely or at least partially, within the main memory 704 or within the processor 702 during execution thereof by the computer system 700, with the main memory 704 and the processor 702 also constituting machine-readable media.

The instructions 724 may further be transmitted or received over a network 726 via the network interface device 720 utilizing any one of a number of well-known transfer protocols (e.g., HTTP).

While the computer-readable medium 722 is shown in an example embodiment to be a single medium, the term "computer-readable medium" should be taken to include a single medium or multiple photo (e.g., a centralized or distributed database, and/or associated caches and servers) that store the one or more sets of instructions 724. The term "computer-readable medium" shall also be taken to include any medium that is capable of storing, encoding, or carrying a set of instructions 724 for execution by the machine that cause the machine to perform any one or more of the methodologies of the present disclosure, or that is capable of storing, encoding, or carrying data structures used by or associated with such a set of instructions 724. The term "computer-readable medium" shall, accordingly, be taken to include, but not be limited to, solid-state memories, optical photo, and magnetic photo.

Furthermore, the computer-readable medium 722 is non-transitory in that it does not embody a propagating signal. However, labeling the tangible computer-readable medium 722 "non-transitory" should not be construed to mean that the medium 722 is incapable of movement—the medium 722 should be considered as being transportable from one physical location to another. Additionally, since the computer-readable medium 722 is tangible, the medium 722 may be considered to be a machine-readable device.

Example Mobile Device

Figure 8:
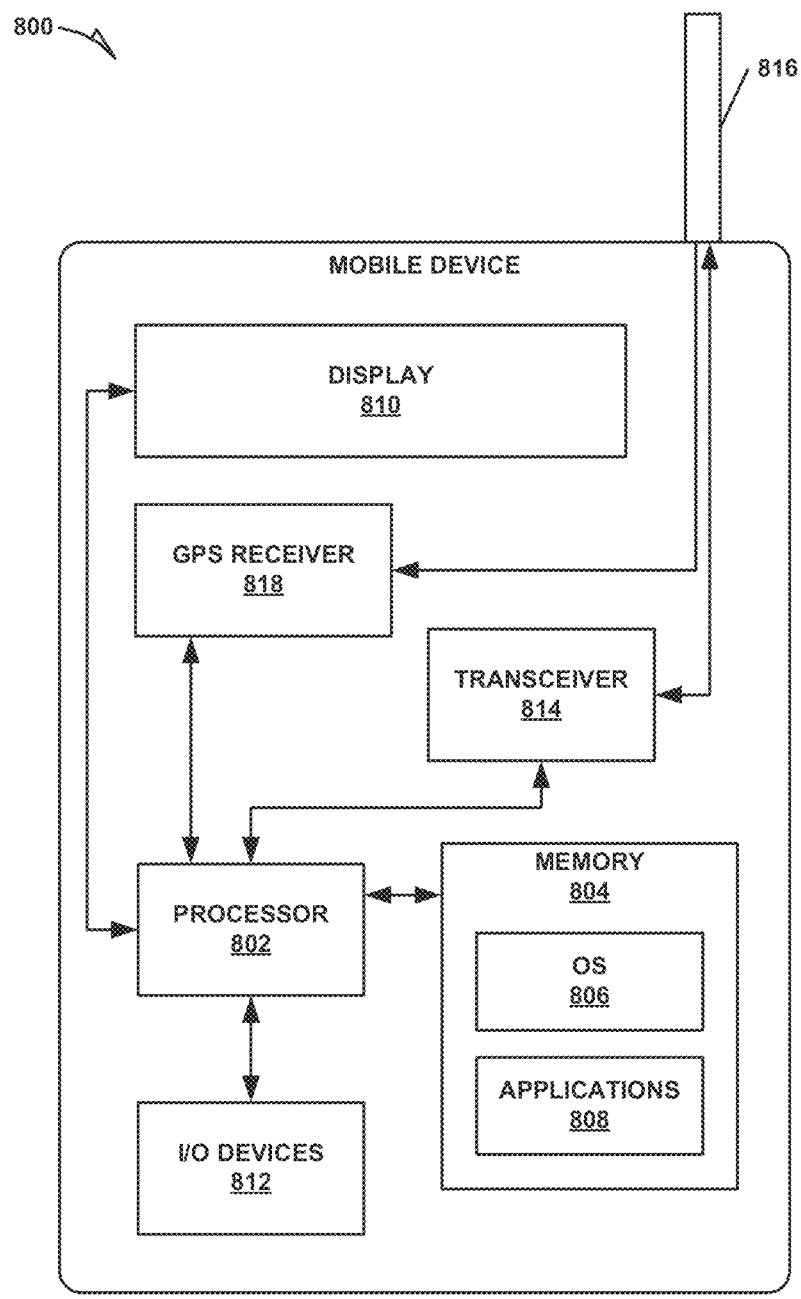
FIG. 8 is a block diagram illustrating a mobile device, according to an example embodiment.

FIG. 8 is a block diagram illustrating a mobile device 800, according to an example embodiment. The mobile device 800 may include a processor 802. The processor 802 may be any of a variety of different types of commercially available processors 802 suitable for mobile devices 800 (for example, an XScale architecture microprocessor, a microprocessor without interlocked pipeline stages (MIPS) architecture processor, or another type of processor 802). A memory 804, such as a random access memory (RANI), a flash memory, or another type of memory, is typically accessible to the processor 802. The memory 804 may be adapted to store an operating system (OS) 806, as well as applications 808, such as a mobile location enabled application that may provide location-based services (LBSs) to a user 100A, 110B. The processor 802 may be coupled, either directly or via appropriate hardware, to a display 810 and to one or more input/output (I/O) devices 812, such as a keypad, a touch panel sensor, a microphone, and the like. Similarly, in some embodiments, the processor 802 may be coupled to a transceiver 814 that interfaces with an antenna 816. The transceiver 814 may be configured to both transmit and receive cellular network signals, wireless data signals, or other types of signals via the antenna 816, depending on the nature of the mobile device 800. Further, in some configurations, a GPS receiver 818 may also make use of the antenna 816 to receive GPS signals.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Such embodiments of the disclosed subject matter are described herein, individually or collectively, merely for convenience and without intending to voluntarily limit the scope of this application to any single embodiment. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, the disclosed subject matter lies in less than all features of a single disclosed embodiment. Thus, the following claims are hereby incorporated into the Detailed Description, with each claim standing on its own as a separate embodiment.

What is claimed is:

1. A method comprising:
   queuing, in a download queue, at least two file download requests;
   determining that the at least two file download requests correspond to a same context component;
   receiving a third file download request;
   determining that the third file download request corresponds to the same context component as the at least two file download requests;
   in response to determining that the third file download request corresponds to the same context component, determining that the third file download request exceeds a parameter of a context limit rule; and
   discarding the third file download request in response to determining that the
   third file download request exceeds the parameter of the context limit rule.

2. The method of claim 1, wherein the same context component comprises a same part of an application, and wherein the parameter comprises a maximum number of file download requests that include a same context component, further comprising concurrently executing the at least two file download requests.

3. The method of claim 1, further comprising:
   receiving indications of multiple active components of a client application;
   determining a number of components indicated in each of the file download requests matching the multiple active components of the client application; and
   selecting file download requests with a higher number of components matching the multiple active components of the client application over file download requests with a lower number of components matching the multiple active components of the client application.

4. The method of claim 3, wherein each of the at least two file download requests specifies an in-context priority level and an out-of-context priority level and, based on two of the file download requests having a same number of matching context components with the context of the application, ranking each of the file download requests in the download queue by:
   ranking the two file download requests based on their respective in-context priority levels based on the same number of matching active components being greater than zero; or
   ranking the two file download requests based on their respective out-of-context priority levels based on the same number of matching active components being zero.

5. The method of claim 4, wherein each of the file download requests specifies a relative ordering value and, based on the two file download requests having the same in-context priority level or the same out-of-context priority level, ranking each of the file download requests in the download queue based on their respective relative ordering values.

6. The method of claim 5, wherein the relative ordering value is based on a respective time at which each of the two file download requests was added to the download queue by the client application.

7. The method of claim 1, further comprising:
   queuing download requests for files below a threshold size on a first queue and other download requests on a second queue; and concurrently executing two download requests in the first queue based on a respective time at which each of the two file download requests was issued by a client application.

8. The method of claim 1, further comprising:
receiving an indication of an active component, the indication specifying whether a user is located in a viewer component and whether the user is located in a browser component, and wherein each download request indicates whether the viewer component and whether the browser component will use the respective file; and
ranking the at least two file download requests based on the received indication.

9. The method of claim 1, further comprising:
receiving an indication of whether a user is interacting with a message via a message application and a sender of the message, and wherein each download request indicates whether the respective file is from the sender of the message; and
ranking the at least two file download requests based on the received indication.

10. A system comprising:
processing circuitry configured to perform operations comprising:
queuing, in a download queue, at least two file download requests;
determining that the at least two file download requests correspond to a same context component;
receiving a third file download request;
determining that the third file download request corresponds to the same context component as the at least two file download requests;
in response to determining that the third file download request corresponds to the same context component, determining that the third file download request exceeds a parameter of a context limit rule; and
discarding the third file download request in response to determining that the third file download request exceeds the parameter of the context limit rule.

11. The system of claim 10, wherein the same context component comprises a same part of an application, wherein the parameter comprises a maximum number of file download requests that include a same context component, and wherein the operations further comprise concurrently executing the at least two file download requests.

12. The system of claim 11, wherein the operations further comprise:
queuing download requests for files below a threshold size on a first queue and other download requests on a second queue; and
concurrently executing two download requests in the first queue based on a respective time at which each of the two file download requests was issued by a client application.

13. The system of claim 10, the operations further comprising:
receiving indications of multiple active components of a client application;
determining a number of components indicated in each of the file download requests matching the multiple active components of the client application; and
selecting file download requests with a higher number of components matching the multiple active components of the client application over file download requests with a lower number of components matching the multiple active components of the client application.

14. The system of claim 13, wherein each of the at least two file download requests specifies an in-context priority level and an out-of-context priority level and, based on two of the file download requests having a same number of matching context components with the context of the application, ranking each of the file download requests in the download queue by:
ranking the two file download requests based on their respective in-context priority levels based on the same number of matching active components being greater than zero; or
ranking the two file download requests based on their respective out-of-context priority levels based on the same number of matching active components being zero.

15. The system of claim 14, wherein each of the file download requests specifies a relative ordering value and, based on the two file download requests having the same in-context priority level or the same out-of-context priority level, ranking each of the file download requests in the download queue based on their respective relative ordering values.

16. The system of claim 15, wherein the relative ordering value is based on a respective time at which each of the two file download requests was added to the download queue by the client application.

17. A non-transitory computer-readable medium storing program code which, when executed, is operative to cause a computing device to perform operations comprising:
queuing, in a download queue, at least two file download requests;
determining that the at least two file download requests correspond to a same context component;
receiving a third file download request;
determining that the third file download request corresponds to the same context component as the at least two file download requests;
in response to determining that the third file download request corresponds to the same context component, determining that the third file download request exceeds a parameter of a context limit rule; and
discarding the third file download request in response to determining that the third file download request exceeds the parameter of the context limit rule.

18. The non-transitory computer-readable medium of claim 17, wherein the same context component comprises a same part of an application, wherein the parameter comprises a maximum number of file download requests that include a same context component, and wherein the operations further comprise concurrently executing the at least two file download requests.

19. The non-transitory computer-readable medium of claim 17, the operations further comprising:
receiving indications of multiple active components of a client application;
determining a number of components indicated in each of the file download requests matching the multiple active components of the client application; and
selecting file download requests with a higher number of components matching the multiple active components of the client application over file download requests with a lower number of components matching the multiple active components of the client application.

20. The non-transitory computer-readable medium of claim 17, wherein the operations further comprise:
  queuing download requests for files below a threshold size on a first queue and other download requests on a second queue; and
  concurrently executing two download requests in the first queue based on a respective time at which each of the two file download requests was issued by a client application.

* * * * *

UNITED STATES PATENT AND TRADEMARK OFFICE
CERTIFICATE OF CORRECTION

| | |
|---|---|
| PATENT NO. | : 11,496,546 B2 |
| APPLICATION NO. | : 17/367755 |
| DATED | : November 8, 2022 |
| INVENTOR(S) | : Hudgin et al. |

It is certified that error appears in the above-identified patent and that said Letters Patent is hereby corrected as shown below:

In the Claims

In Column 18, Line 17, Claim 1, after "that the", delete a linebreak

Signed and Sealed this
Twelfth Day of September, 2023

*Katherine Kelly Vidal*

Katherine Kelly Vidal
*Director of the United States Patent and Trademark Office*